United States Patent
Shinozawa et al.

(10) Patent No.: US 8,690,985 B2
(45) Date of Patent: Apr. 8, 2014

(54) HYDROGEN STORAGE MATERIAL AND METHOD OF PRODUCING THE SAME

(75) Inventors: Tamio Shinozawa, Numazu (JP);
Takanobu Yamada, Yamagata-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 984 days.

(21) Appl. No.: 12/219,667

(22) Filed: Jul. 25, 2008

(65) Prior Publication Data

US 2009/0025509 A1 Jan. 29, 2009

(30) Foreign Application Priority Data

Jul. 27, 2007 (JP) ............................... 2007-196317

(51) Int. Cl.
  *B22F 1/00* (2006.01)
  *B22F 9/00* (2006.01)
  *C21B 15/04* (2006.01)
  *C22B 5/20* (2006.01)
  *C22C 1/04* (2006.01)

(52) U.S. Cl.
  USPC .............................................. 75/352; 420/900

(58) Field of Classification Search
  USPC .............................................. 75/352; 420/900
  See application file for complete search history.

(56) References Cited

U.S. PATENT DOCUMENTS 5,763,363 A 6/1998 Shulz et al.
7,201,789 B1 * 4/2007 Schulz et al. ............... 75/352

FOREIGN PATENT DOCUMENTS

| | | |
|---|---|---|
| JP | 63-072849 | 4/1988 |
| JP | 2000-265233 | 9/2000 |
| JP | 2002-53926 | 2/2002 |
| JP | 2004-156113 | 6/2004 |

OTHER PUBLICATIONS

Japanese Office Action dated Jun. 9, 2009, for JP 2007-196317.
Office Action from the German Patent Office issued on Sep. 25, 2009 for Appl. No. DE 10 2008 040 734.8.
Ruggeri, S. et al., "Mechanically driven crystallization of amorphous MgNi alloy during prolonged milling: application in Ni-MH batteries," Journal of Alloys and Compounds, vol. 339, (2002), pp. 195-201.
Abdellaoui, M. et al., "Structural characterization and reversible hydrogen absorption properties of $Mg_2Ni$ rich nanocomposite materials synthesized by mechanical alloying," Journal of Alloys and Compounds, vol. 268, (1998), pp. 233-240.

* cited by examiner

*Primary Examiner* — Weiping Zhu
(74) *Attorney, Agent, or Firm* — Finnegan, Henderson, Farabow, Garrett & Dunner, LLP

(57) ABSTRACT

A hydrogen storage material is formed by mixing and combining particles of a metal A selected from Mg and Al, particles of a metal B selected from Ni and Cu, and particles of an intermetallic compound A-B of the metal A and the metal B, together. A method of producing the hydrogen storage material includes a step of mixing the particles of the intermetallic compound A-B with the particles of the metal B, a step of adding particles of a hydride A-H of the metal A to the mixture and mixing them together, and a step of dehydrogenating the hydride A-H to convert it to the metal A.

13 Claims, 5 Drawing Sheets

TABLE 1

| | Sample No. | Composition (wt%) | | | Mg/Ni (atomic ratio) | Ni (atomic ratio) | Test Results | | |
|---|---|---|---|---|---|---|---|---|---|
| | | $MgH_2$ | $Mg_2Ni$ | Ni | | | Hydrogenation (60°C) | Hydrogen Storage Capacity (mass%) | 80% Absorption Time (min.) |
| INVENTION | 1 | 56.21 | 43.66 | 0.63 | 12.0 | 0.80 | OCCURRED | 5.8 | 20 |
| | 2 | 26.94 | 72.92 | 0.13 | 4.0 | 0.60 | OCCURRED | 4.6 | 24 |
| | 3 | 70.76 | 29.22 | 0.03 | 25.0 | 0.50 | OCCURRED | 6.4 | 27 |
| | 4 | 70.75 | 29.22 | 0.02 | 30.0 | 0.50 | OCCURRED | 6.4 | 27 |
| | 5 | 75.62 | 24.36 | 0.02 | 50.0 | 0.50 | OCCURRED | 6.6 | 27 |
| | 6 | 22.18 | 77.55 | 0.27 | 4.0 | 0.90 | OCCURRED | 4.4 | 18 |
| | 7 | 22.21 | 77.49 | 0.30 | 4.0 | 0.95 | OCCURRED | 4.4 | 17 |
| | 8 | 85.00 | 13.00 | 2.00 | 15.5 | 0.46 | OCCURRED | 6.9 | 20 |
| | 9 | 12.26 | 87.66 | 0.08 | 2.0 | 0.40 | OCCURRED | 2.8 | 50 |
| | 10 | 56.10 | 43.90 | <0.01 | 32.0 | 0.00 | OCCURRED | 5.8 | 55 |
| | 11 | 36.59 | 63.41 | <0.01 | 90.0 | 0.50 | OCCURRED | 5.0 | 55 |
| COMPARATIVE EXAMPLE | 12 | 100.00 | 0.00 | 0.00 | pure Mg | | NOT OCCURRED | — | — |

FIG. 4

TABLE 1

| | SAMPLE No. | COMPOSITION (wt%) | | | Mg/Ni (ATOMIC RATIO) | Ni (ATOMIC RATIO) | TEST RESULTS | | |
|---|---|---|---|---|---|---|---|---|---|
| | | MgH$_2$ | Mg$_2$Ni | Ni | | | HYDROGENATION (60°C) | HYDROGEN STORAGE CAPACITY (mass%) | 80% ADSORPTION TIME (min.) |
| INVENTION | 1 | 56.21 | 43.66 | 0.63 | 12.0 | 0.80 | OCCURRED | 5.8 | 20 |
| | 2 | 26.94 | 72.92 | 0.13 | 4.0 | 0.60 | OCCURRED | 4.6 | 24 |
| | 3 | 70.76 | 29.22 | 0.03 | 25.0 | 0.50 | OCCURRED | 6.4 | 27 |
| | 4 | 70.75 | 29.22 | 0.02 | 30.0 | 0.50 | OCCURRED | 6.4 | 27 |
| | 5 | 75.62 | 24.36 | 0.02 | 50.0 | 0.50 | OCCURRED | 6.6 | 27 |
| | 6 | 22.18 | 77.55 | 0.27 | 4.0 | 0.90 | OCCURRED | 4.4 | 18 |
| | 7 | 22.21 | 77.49 | 0.30 | 4.0 | 0.95 | OCCURRED | 4.4 | 17 |
| | 8 | 85.00 | 13.00 | 2.00 | 15.5 | 0.46 | OCCURRED | 6.9 | 20 |
| | 9 | 12.26 | 87.66 | 0.08 | 2.0 | 0.40 | OCCURRED | 2.8 | 50 |
| | 10 | 56.10 | 43.90 | <0.01 | 32.0 | 0.00 | OCCURRED | 5.8 | 55 |
| | 11 | 36.59 | 63.41 | <0.01 | 90.0 | 0.50 | OCCURRED | 5.0 | 55 |
| COMPARATIVE EXAMPLE | 12 | 100.00 | 0.00 | 0.00 | pure Mg | | NOT OCCURRED | – | – |

FIG.5

TABLE 2

| | SAMPLE No. | COMPOSITION (wt%) | | | Mg/Ni (ATOMIC RATIO) | Ni (ATOMIC RATIO) | HYDROGEN SORPTION CHARACTERISTICS | | |
|---|---|---|---|---|---|---|---|---|---|
| | | MgH$_2$ | Mg$_2$Ni | Ni | | | ADSORPTION (60°C) | DESORPTION (300°C) | OVERALL EVALUATION |
| INVENTION | A | 85.00 | 13.00 | 2.00 | 15.5 | 0.46 | ○ | ○ | ○ |
| COMPARATIVE EXAMPLE | B | 95.00 | 5.00 | 0.00 | 79.5 | 0.00 | △ | △ | △ |
| COMPARATIVE EXAMPLE | C | 100.00 | 0.00 | 0.00 | – | – | × | △ | × |

HYDROGEN STORAGE MATERIAL AND METHOD OF PRODUCING THE SAME

INCORPORATION BY REFERENCE

The disclosure of Japanese Patent Application No. 2007-196317 filed on Jul. 27, 2007, including the specification, drawings and abstract, is incorporated herein by reference in its entirety.

BACKGROUND OF THE INVENTION

1. Field of the Invention

This invention relates to hydrogen storage materials and methods of producing the hydrogen storage materials.

2. Description of the Related Art

A wide variety of hydrogen storage materials have been proposed, and hydrogen storage materials having Mg as a base material, as one type of the various hydrogen storage materials, have been developed. While Mg is an excellent hydrogen storage material that is lightweight and has a high hydrogen storage capability of 7.6 mass %, its reaction temperature is as high as 350-400° C., which means that Mg cannot store or adsorb hydrogen at room temperature.

Japanese Patent Application Publication No. 2002-53926 (JP-A-2002-53926) discloses a hydrogen storage alloy powder in which Ni ultrafine particles are dispersed in Mg crystal grains. The disclosed alloy powder suffers from its slow hydrogen-adsorption speed at around room temperature and slow desorption speed at about 300° C.

Japanese Patent Application Publication No. 2004-156113 (JP-A-2004-156113) discloses a hydrogen storage alloy powder in which an intermetallic compound $Mg_2Ni$ is dispersed in a Mg matrix, and Japanese Patent Application Publication No. 2000-265233 discloses a hydrogen storage alloy in which an intermetallic compound $Mg_2Ni$ and Mg—Ni base ultrafine particles are dispersed in Mg crystal grains. These alloy materials also suffer from its slow hydrogen-adsorption speed at around room temperature and slow desorption speed at around 300° C.

SUMMARY OF THE INVENTION

This invention provides a hydrogen storage material having an increased hydrogen adsorption speed at around room temperature and an increased desorption speed at around 300° C., and a method of producing the hydrogen storage material.

A first aspect of the invention provides a hydrogen storage material comprising particles of a metal A selected from the group consisting of Mg and Al, particles of a metal B selected from the group consisting of Ni and Cu, and particles of an intermetallic compound A-B of the metal A and the metal B, the particles of the metal A, the metal B and the intermetallic compound A-B being mixed and combined into a composite material as the hydrogen storage material.

A second aspect of the invention provides a method of producing the hydrogen storage material, which includes a step of mixing the particles of the intermetallic compound A-B of the metal A and the metal B with the particles of the metal B, a step of adding particles of a hydride A-H of the metal A to a mixture of the intermetallic compound A-B and the metal B, and mixing the particles together, and a step of dehydrogenating the hydride A-H into the metal A.

BRIEF DESCRIPTION OF THE DRAWINGS

The foregoing and further objects, features and advantages of the invention will become apparent from the following description of embodiments with reference to the accompanying drawings, wherein like numerals are used to represent like elements, and wherein:

FIG. 4 is a table indicating the composition, Mg/Ni ratio, Ni ratio and test results of samples of the invention and comparative example; and FIG. 5 is a table indicating conditions and results of hydrogen adsorption and desorption tests conducted on samples of the invention and comparative examples.

DETAILED DESCRIPTION OF THE EMBODIMENTS

Figure 1:
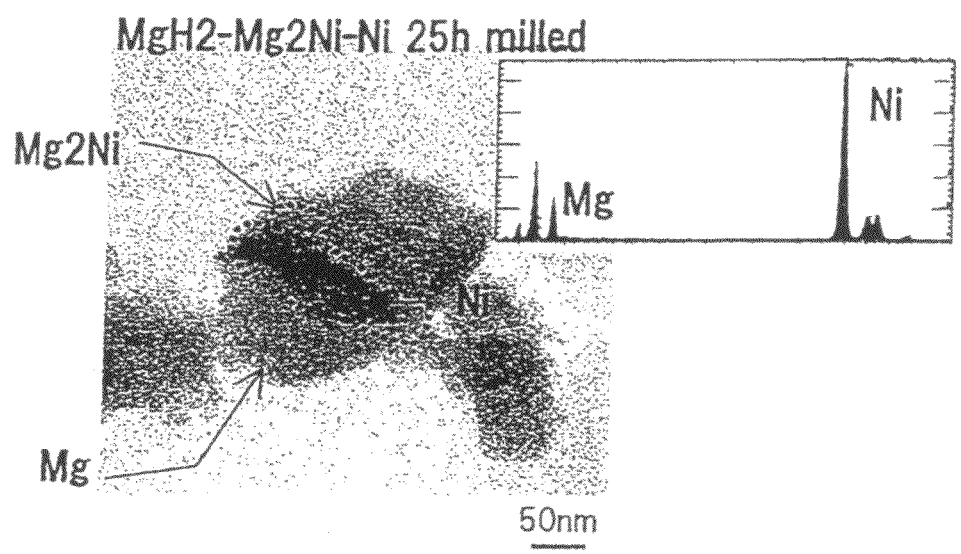
FIG. 1 shows a photomicrograph taken by a transmission electron microscope, of a hydrogen storage material according to one embodiment of the invention, including a chart in its upper right-hand section for identifying $Mg_2Ni$.

In one embodiment of the invention, a metal A is Mg, a metal B is Ni, an intermetallic compound A-B is $Mg_2Ni$, and a hydride of the metal A is $MgH_2$.

Various embodiments of the invention, including the above embodiment, may include the following combinations of metal A, metal B, intermetallic compound A-B, and hydride A-H of metal A, as typical examples.

A first example of the combinations is that of Mg as metal A, Ni as metal B, $Mg_2Ni$ as intermetallic compound A-B, and $MgH_2$ as hydride A-H. A second example of the combinations is that of Mg as metal A, Cu as metal B, $Mg_2Cu$ as intermetallic compound A-B, and $MgH_2$ as hydride A-H. A third example of the combinations is that of Al as metal A, Ni as metal B, $Al_3Ni$ as intermetallic compound A-B, and $AlH_3$ as hydride A-H. A fourth example of the combinations is that of Al as metal A, Cu as metal B, AlCu as intermetallic compound A-B, and $AlH_3$ as hydride A-H. In any of these combinations, the intermetallic compound A-B starts being hydrogenated at a lower temperature than the metal A serving as a hydrogen storage medium, and the metal B serves as a catalyst for promoting the hydrogenation. In this process, a temperature rise due to heat generated by hydrogenation of the intermetallic compound A-B causes the metal A to start being hydrogenated, and a further rise in temperature due to heat generated by hydrogenation of the metal A promotes hydrogenation of the metal A, namely, storage or adsorption of hydrogen.

While heat is required for release of hydrogen, the process of releasing hydrogen is the reverse of the above-described process of storing or adsorbing hydrogen, and thus the release speed is significantly increased.

EXAMPLES

To prepare some samples of the hydrogen storage material, Mg (=metal A) was used as a storage medium, and powders of $MgH_2$ (=hydride A-H of metal A), $Mg_2Ni$ (=intermetallic compound A-B), and Ni (=metal B) were used as raw materials. The details of the raw materials (starting materials) will be described below.

Starting Materials

As starting materials, $MgH_2$ powder manufactured by Avocado Company and having a purity of 99% and the average grain size of several dozens of µm, $Mg_2Ni$ powder manufactured by Japan Metals & Chemicals Co., Ltd. and having a purity of 99% and the average grain size of several dozens of µm, and Ni powder manufactured by Japan Pure Chemical Co., Ltd. and having a purity of 99.9% and the average grain size of several dozens of µm were prepared. For each sample, the powders as indicated above were measured to provide the composition, Mg/Ni ratio, and the Ni ratio as indicated in FIG. 4. It is to be noted that the "Mg/Ni ratio" is the atomic ratio of the total Mg (Mg of $Mg_2Ni$ and $MgH_2$) to the total Ni (metal Ni and Ni of $Mg_2Ni$), and "Ni ratio" is the atomic ratio of the metal Ni to the total Ni.

In mixing and grinding processes, the planetary ball mill P7 manufactured by Fritsch was used. An atmosphere-controlled milling container made of stainless steel was used as a mill container. The container was charged with each sample such that the sample having the composition and ratios as indicated in FIG. 4 weighs 5 g in total. At the same time, benzene was added as a milling aid for preventing the powders from attaching to the inner wall of the pot and balls. The mixing and grinding process was performed for a desired period of time with one cycle consisting of 1-hour milling at 400 rpm and 15-minute cooling.

In a first step of the above process, each starting material was pulverized in advance for about 25 to 100 hours. In a second step, the $Mg_2Ni$ powder and Ni power that went through the first step were mixed together by mechanical milling. The milling time was between the above-mentioned one cycle and two cycles. In a third step, $MgH_2$ that went through the first step was added to and mixed with the mixture obtained from the second step. The third step was performed for a maximum duration of 100 hours, as the sum of the above-described cycles. Here, the intermetallic compound $MgH_2$, rather than metal Mg, was used as a source of Mg, for the reason as will be described below.

The metal Mg has high ductility, and can be easily deformed. Thus, if Mg particles are mixed with $Mg_2Ni$ particles and Ni particles, the Mg particles are deformed during mixing such that the $Mg_2Ni$ particles and Ni particles are caught into and embedded or incorporated in the Mg particles. As a result, of the entire surface area of the material resulting from the mixing step, the exposed areas of the $Mg_2Ni$ particles and Ni particles, namely, the areas of contact of these particles with hydrogen, are reduced, and the reduced contact area becomes an impediment to start of hydrogenation at a low temperature by use of these particles.

On the other hand, the metallic compound $MgH_2$ is far harder and more brittle than Mg, and is not deformed during mixing. Therefore, the $Mg_2Ni$ particles and Ni particles are not embedded in the $MgH_2$ particles, but are intimately placed or deposited on the surfaces of the $MgH_2$ particles. Thus, a sufficiently large area of contact is ensured between the $Mg_2Ni$ and Ni particles and hydrogen, and hydrogenation is started at a low temperature with higher reliability, as compared with the case where Mg is used alone.

Another reason for which $MgH_2$ rather than Mg was used is that H is the only useless, extra element brought into the material for obtaining the effects as described above, and can be easily removed in a step as described below; therefore, the use of $MgH_2$ has substantially no adverse influence on the hydrogen storage capability of the resulting product.

Dehydrogenation Step

After mixing in the two steps as described above, the mixture of $Mg_2Ni$, Ni and $MgH_2$ powders was heated at 300° C. for 1 hour under an atmospheric pressure of 1 atm. In this manner, dehydrogenation was effected, and the hydride $MgH_2$ was converted to metal Mg.

The thus obtained samples in the form of powders were observed with a transmission electron microscope. FIG. 1 shows a photomicrograph taken by the transmission electron microscope, of Sample No. 8 (FIG. 4) as a typical example. As shown in FIG. 1, a $Mg_2Ni$ particle (dark gray, small particle) and a Ni particle (almost black small particle) are combined with each other and with a Mg particle (light gray, small particle); such that the $Mg_2Ni$ particle and Ni particle are in intimate contact with each other on a surface of the Mg particle. The chart shown in an upper, right-hand section of FIG. 1 indicates the result of a composition analysis of the particle (dark gray, small particle), in which peaks of Mg and Ni are detected, and the particle in question was identified as a $Mg_2Ni$ particle.

Figure 2:
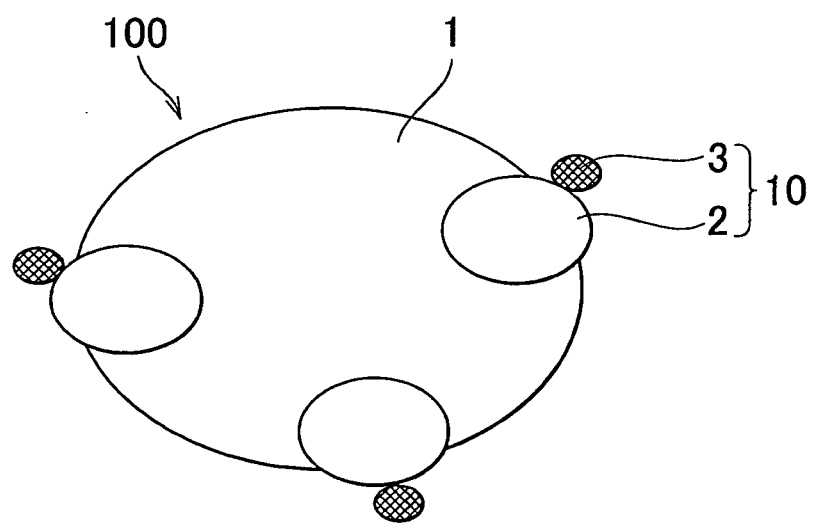
FIG. 2 is a schematic view showing the configuration of the hydrogen storage material according to the embodiment of the invention.

Namely, the configuration of the hydrogen storage material of this embodiment is such that relatively small $Mg_2Ni$ particles 2 and even smaller Ni particles 3 are in intimate contact with and fixed on a relatively large Mg particle 1, as schematically shown in FIG. 2. More specifically, the $Mg_2Ni$ particle 2 and Ni particle are brought into intimate contact with each other and combined together in advance to provide a first composite particle 10, and the first composite particle or particles 10 is/are brought into intimate contact with the surface of the Mg particle 1, to form a second composite particle 100. Thus, the hydrogen storage material of this embodiment is a powder or porous structure comprised of the second composite particles 100. In the "powder" form, the second composite particles 100 are spaced or separated from each other. In the "porous structure" form, the second composite particles 100 are flocculated and joined to each other. Generally, the second composite particles 100 are present in the form of a mixture of the "powder" and the "porous structure", rather than in the form of the "powder" alone or in the form of the "porous structure" alone.

While the first composite particles 10 each consisting of one $Mg_2Ni$ particle 2 and one Ni particle 3 combined together are illustrated in FIG. 2 by way of example, for the sake of brevity, the first composite particle 10 is not particularly limited to this configuration. Each of the first composite particles 10, which are formed in the first mixing step, may consist of one $Mg_2Ni$ particle 2 and two or more Ni particles 3 combined together, or may consist of two or more $Mg_2Ni$ particles 2 and two or more Ni particles 3 combined together. The first composite particle 10 may also consist of two or more $Mg_2Ni$ particles 2 combined together, and one or more Ni particles 3 that are joined to and combined with the $Mg_2Ni$ particles 2. Also, the first composite materials 10 constructed as described above may be joined to each other and combined together.

The configuration of the second composite material 100 is not limited to that of FIG. 2 in which the first composite particles 10 are joined to and fixed on one Mg particle 1, but the second composite material 100 may be constructed such that two or more Mg particles 1 are combined together, and one or more first composite particles 10 are joined to and fixed on the combined Mg particles 1. Various other combinations of the Mg particle(s) 1 and the first composite particle(s) 10 may also be employed. The second composite particles 100 thus constructed may be further combined together.

Hydrogen Adsorption Test

For each sample indicated in the table of FIG. 4, a hydrogen adsorption test was conducted under conditions as described below.

Hydrogen Adsorption Test Conditions

The hydrogen storage capacity was calculated from the amount of pressure reduction from an expected hydrogen pressure by so-called Sieverts' method. The measurement was conducted at 60° C., under a pressure of less than 10 atmospheres. Since the pressure reduction is dependent on time, the adsorption speed was evaluated as the time required for adsorbing hydrogen up to 80% of saturation.

The test results are also shown in FIG. 4. Particularly in Samples No. 1-No. 8, out of Samples No. 1-No. 11 of this embodiment, the Mg/Ni ratio is in a desirable range of 2 to 50, and the Ni ratio is in a desirable range of 0.5 to 0.95. In these samples, hydrogenation occurred at a temperature as low as 60° C., and the hydrogen storage capacity was as high as 4.4 to 6.9 mass %, while the 80% adsorption time was in the range of 17 to 27 min., namely, the adsorption speed was sufficiently high.

In Samples No. 9-No. 11 of this embodiment, in which at least one of the Mg/Ni ratio and the Ni ratio was outside the above-indicated range(s), hydrogenation occurred at 60° C. while the hydrogen storage capacity was in the range of 2.8-5.5 mass %, but the 80% adsorption time was 50 to 55 min., which means that a relatively long time was required for adsorbing hydrogen up to 80% of saturation.

In Comparative Example (Sample No. 12) using Mg alone, no hydrogenation occurred under the hydrogen adsorption conditions of this test.

In this connection, it is more desirable to control the Mg/Ni ratio to within the range of 4 to 25, and control the Ni ratio to within the range of 0.5 to 0.9.

Confirmation of Hydrogen Adsorption and Desorption Behaviors

For each sample indicated in FIG. 5, hydrogen adsorption and desorption tests were conducted. The conditions of the adsorption test were those as described above. The conditions of the desorption test were those as described below.

Hydrogen Desorption Test Conditions

The amount of gas released (i.e., the amount of hydrogen desorbed) with respect to time was measured at 300° C. under an atmospheric pressure, by $H_2$ replacement jar method, and the amount of hydrogen desorbed and the desorption speed were obtained.

Figure 3A:
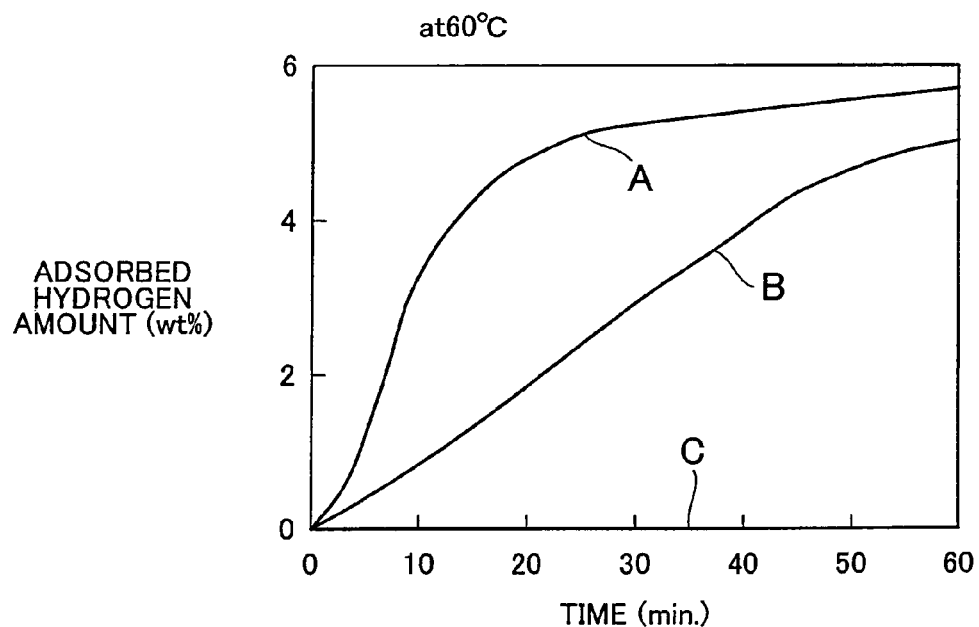
FIG. 3A is a graph indicating the amount (wt %) of hydrogen adsorbed, with respect to time (min.) elapsed from start of a hydrogen adsorption test.
Figure 3B:
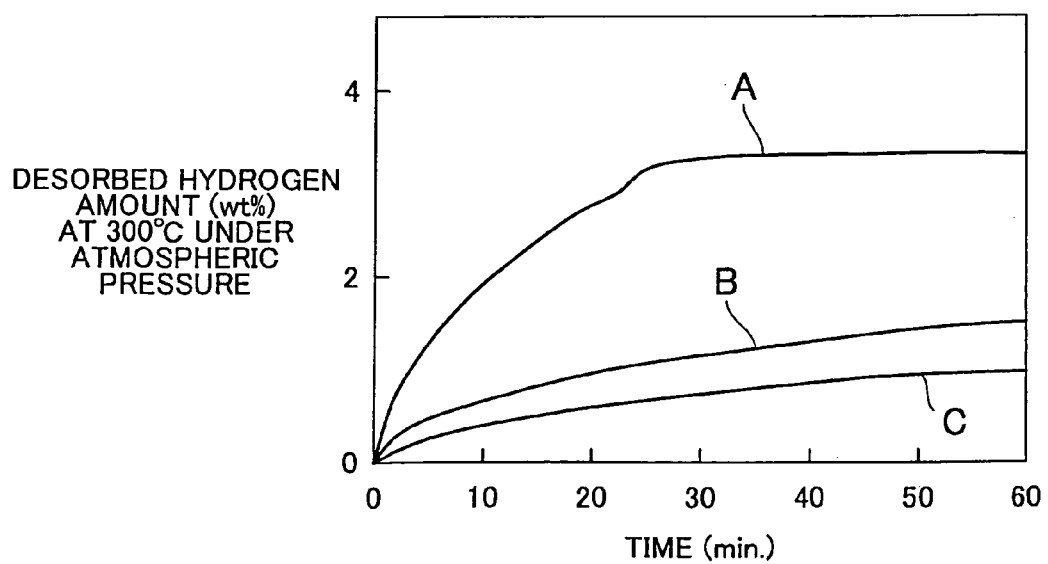
FIG. 3B is a graph indicating the amount (wt %) of hydrogen desorbed, with respect to time (min.) elapsed from start of a hydrogen desorption test.

The test results are shown in FIG. 3A and FIG. 3B. FIG. 3A is a graph indicating the amount (wt %) of hydrogen adsorbed, with respect to time (min.) elapsed from start of the adsorption test, and FIG. 3B is a graph indicating the amount (wt %) of hydrogen desorbed, with respect to time (min.) elapsed from start of the desorption test.

As shown in FIGS. 3A and 3B, in Sample A of this embodiment, hydrogen adsorption proceeded in a very short time (20 min. required for adsorbing 80% of saturation), and hydrogen desorption proceeded in a very short time (i.e., the desorption was substantially completed in 25 min.).

On the other hand, in Sample B (that does not contain metal Ni as a catalyst) of comparative examples, hydrogen adsorption and desorption was not finished even after 60 min., the maximum time in these tests, and no saturation was recognized at this point. The adsorbed hydrogen amount and desorbed hydrogen amount measured upon a lapse of 60 min. were far smaller than those of Sample A of this embodiment.

In Sample C (hydride: $MgH_2$) of the comparative examples, no hydrogen adsorption occurred, and hydrogen derived from the hydride was slowly released from the material in the desorption test.

According to the illustrated embodiment, the hydrogen storage material having an increased adsorption speed at around room temperature and an increased desorption speed at about 300° C., and the method of producing the material, are provided.

In the hydrogen storage material of this embodiment, the metal A (Mg or Al) is a hydrogen storage medium, and the intermetallic compound A-B of metal A and metal B (Ni or Cu), which is more likely to be hydrogenated than the metal A, starts being hydrogenated at a lower temperature than the metal A. As the temperature rises due to heat generated by hydrogenation of the intermetallic compound A-B, the metal A starts being hydrogenated, and the hydrogenation of the metal A proceeds successively due to heat generated by the hydrogenation. Thus, hydrogenation, or hydrogen adsorption or storage, occurs at a significantly reduced temperature as compared with the case where the metal A is used alone. The metal B serves as a catalyst for promoting hydrogenation of the intermetallic compound A-B, and, particularly, promotes initiation of hydrogenation. When the metal A is Mg, and the metal B is Ni, for example, the hydrogenation temperature of the intermetallic compound A-B (=$Mg_2Ni$) is lower by only a small degree than that of the metal A (=Mg), and therefore, the catalytic activity of the metal B (=Ni) is of great importance to acceleration of hydrogenation of the intermetallic compound A-B (=$Mg_2Ni$).

In the method of producing the hydrogen storage material of this embodiment, the intermetallic compound A-B of metal A and metal B and the metal B are crushed or pulverized into fine particles, and the particles of the intermetallic compound A-B and the particles of the metal B are mixed together. Then, particles of the hydride A-H of metal A are added to and mixed with the mixture of A-B and B, so that the fine particles of the intermetallic compound A-B and the metal B are placed on the surfaces of the particles of the hydride A-H. In the following dehydrogenation step, the hydride A-H is converted to the metal A. As a result, the particles of the intermetallic compound A-B and the particles of the metal B are deposited on the surfaces of the particles of the metal A, such that the particles of these three types of materials are in intimate contact with each other. In this condition, the above-described process of promoting hydrogenation works efficiently. Namely, the intermetallic compound A-B placed on the surfaces of the particles of the metal A is likely to be brought into contact with hydrogen, and is thus hydrogenated first under the catalytic activity of the metal B, and hydrogenation of metal A is initiated due to heat generated by the hydrogenation of the intermetallic compound A-B.

What is claimed is:

1. A method of producing a hydrogen storage material comprising particles of a metal A selected from the group consisting of Mg and Al, particles of a metal B selected from the group consisting of Ni and Cu, and particles of an intermetallic compound A-B of the metal A and the metal B, the particles of the metal A, the metal B, and the intermetallic compound A-B being mixed and combined into a composite material as the hydrogen storage material, comprising:
   a first step of mixing the particles of the intermetallic compound A-B of the metal A and the metal B with the particles of the metal B;
   a second step of adding particles of a hydride A-H of the metal A to a mixture of the intermetallic compound A-B and the metal B, and mixing the particles together; and
   a third step of dehydrogenating the hydride A-H into the metal A,
   wherein the second step is executed after the first step;
   wherein the third step is executed after the second step;

wherein the metal A is Mg, the metal B is Ni, and the intermetallic compound A-B of the metal A and the metal B is $Mg_2Ni$; and wherein a Mg/Ni atomic ratio of total Mg to total Ni is in a range of about 12 to about 50, and a metal B/total Ni atomic ratio is in a range of about 0.5 to about 0.8.

2. The method according to claim 1, wherein the hydride A-H of the metal A is $MgH_2$.

3. The method according to claim 1, wherein the first step further comprises mixing the particles of the intermetallic compound A-B of the metal A and the metal B with the particles of the metal B such that the particles form first composite particles.

4. The method according to claim 3, wherein the second step further comprises adding particles of the hydride A-H of the metal A to the first composite particles, and mixing the particles together such that the particles form second composite particles.

5. A method of producing a hydrogen storage material comprising particles of a metal A selected from the group consisting of Mg and Al, particles of a metal B selected from the group consisting of Ni and Cu, and particles of an intermetallic compound A-B of the metal A and the metal B, the particles of the metal A, the metal B, and the intermetallic compound A-B being mixed and combined into a composite material as the hydrogen storage material, comprising:

a first step of mixing the particles of the intermetallic compound A-B of the metal A and the metal B with the particles of the metal B;

a second step of adding particles of a hydride A-H of the metal A to a mixture of the intermetallic compound A-B and the metal B, and mixing the particles together; and a third step of dehydrogenating the hydride A-H into the metal A, wherein the second step is executed after the first step;

wherein the third step is executed after the second step; and wherein the metal A is Mg, the metal B is Cu, and the intermetallic compound A-B of the metal A and the metal B is $Mg_2Cu$.

6. The method according to claim 5, wherein the first step further comprises mixing the particles of the intermetallic compound A-B of the metal A and the metal B with the particles of the metal B such that the particles form first composite particles.

7. The method according to claim 6, wherein the second step further comprises adding particles of the hydride A-H of the metal A to the first composite particles, and mixing the particles together such that the particles form second composite particles.

8. A method of producing a hydrogen storage material comprising particles of a metal A selected from the group consisting of Mg and Al, particles of a metal B selected from the group consisting of Ni and Cu, and particles of an intermetallic compound A-B of the metal A and the metal B, the particles of the metal A, the metal B, and the intermetallic compound A-B being mixed and combined into a composite material as the hydrogen storage material, comprising:

a first step of mixing the particles of the intermetallic compound A-B of the metal A and the metal B with the particles of the metal B;

a second step of adding particles of a hydride A-H of the metal A to a mixture of the intermetallic compound A-B and the metal B, and mixing the particles together; and a third step of dehydrogenating the hydride A-H into the metal A, wherein the second step is executed after the first step;

wherein the third step is executed after the second step; and wherein the metal A is Al, the metal B is Ni, and the intermetallic compound A-B of the metal A and the metal B is $Al_3Ni$.

9. The method according to claim 8, wherein the first step further comprises mixing the particles of the intermetallic compound A-B of the metal A and the metal B with the particles of the metal B such that the particles form first composite particles.

10. The method according to claim 9, wherein the second step further comprises adding particles of the hydride A-H of the metal A to the first composite particles, and mixing the particles together such that the particles form second composite particles.

11. A method of producing a hydrogen storage material comprising particles of a metal A selected from the group consisting of Mg and Al, particles of a metal B selected from the group consisting of Ni and Cu, and particles of an intermetallic compound A-B of the metal A and the metal B, the particles of the metal A, the metal B, and the intermetallic compound A-B being mixed and combined into a composite material as the hydrogen storage material, comprising:

a first step of mixing the particles of the intermetallic compound A-B of the metal A and the metal B with the particles of the metal B;

a second step of adding particles of a hydride A-H of the metal A to a mixture of the intermetallic compound A-B and the metal B, and mixing the particles together; and a third step of dehydrogenating the hydride A-H into the metal A, wherein the second step is executed after the first step;

wherein the third step is executed after the second step; and wherein the metal A is Al, the metal B is Cu, and the intermetallic compound A-B of the metal A and the metal B is AlCu.

12. The method according to claim 11, wherein the first step further comprises mixing the particles of the intermetallic compound A-B of the metal A and the metal B with the particles of the metal B such that the particles form first composite particles.

13. The method according to claim 12, wherein the second step further comprises adding particles of the hydride A-H of the metal A to the first composite particles, and mixing the particles together such that the particles form second composite particles.

* * * * *